United States Patent [19]
Walch et al.

[11] Patent Number: 5,423,165
[45] Date of Patent: Jun. 13, 1995

[54] CUTTING MACHINE WHICH ADAPTS TO CONTOUR OF GROUND

[75] Inventors: Martin Walch, Dettwiller; Bernard Wattron, Haegen, both of France

[73] Assignee: Kuhn, S.A., Saverne Cedex, France

[21] Appl. No.: 61,366

[22] Filed: May 14, 1993

[30] Foreign Application Priority Data

May 14, 1992 [FR] France ................... 92 06017

[51] Int. Cl.⁶ ................... A01D 34/66; A01D 75/14
[52] U.S. Cl. ........................... 56/6; 56/15.2; 56/15.5; 56/15.9; 56/DIG. 14
[58] Field of Search .............. 56/6, 7, 15.1, 15.2, 56/15.5, 15.7, 15.9, DIG. 9, DIG. 11, DIG. 14

[56] References Cited

U.S. PATENT DOCUMENTS 4,991,383 2/1991 Ermacora ................ 56/15.2 X

FOREIGN PATENT DOCUMENTS 0262743 4/1988 European Pat. Off. .
0361573 4/1990 European Pat. Off. .
1471960 3/1966 France .
4110430 10/1992 Germany .

*Primary Examiner*—Terry Lee Melius
*Attorney, Agent, or Firm*—Oblon, Spivak, McClelland, Maier & Neustadt

[57] ABSTRACT

A cutting machine or harvesting machine which is intended to be connected to the hitch of a power-driven vehicle. According to the invention, during work, a connection device of the cutting machine connects the cutting mechanism to the hitching structure, and allows a displacement in the height of the cutting mechanism in relation to the hitching structure with the wheel able to pivot around an upwardly directed geometric axis.

32 Claims, 8 Drawing Sheets

CUTTING MACHINE WHICH ADAPTS TO CONTOUR OF GROUND

BACKGROUND OF THE INVENTION

1. Field of the Invention

The invention relates to cutting machines such as mowing or harvesting machines. More particularly, the invention relates to cutting machines which are connected or hitched to a power driven vehicle.

2. Discussion of the Background

The invention relates to cutting machines which include a hitching structure intended to be connected to the hitch of a power-driven vehicle. In particular, a cutting mechanism is provided which extends, during work, crosswise to the direction of work (i.e., crosswise with respect to the moving direction of the vehicle) with a first connection device connecting the cutting mechanism to the hitching structure. The first connection device is connected to the cutting mechanism at least approximately in the vicinity of a first longitudinal end of the cutting mechanism and allows the cutting mechanism to pivot in relation to the hitching structure around a geometric axis which is directed forwardly. A first load-lightening element is used to lighten the first longitudinal end of the cutting mechanism, with a wheel placed in the vicinity of a second longitudinal end of the cutting mechanism and which rolls over the ground during work. A second connection device connects the wheel to the cutting mechanism, with the second connection device being connected to the cutting mechanism at least approximately in the vicinity of the second longitudinal end of the cutting mechanism to allow displacement of the height of the cutting mechanism in relation to the wheel. In addition, a second load-lightening element is provided to lighten the second longitudinal end of the cutting mechanism.

In patent application EP 0 361 573, a known mower is described. The hitching structure of this known mower is fastened to the three-point hitch of the tractor and the mowing group extends next to the path of the tractor perpendicular to the direction of work. The first longitudinal end of the mowing group is connected to the hitching structure by a pivot pin with a geometric axis directed or extending parallel to the direction of work. With this structure, the mowing group is able to pivot in relation to the hitching structure around the geometric axis of the pivot pin, to adapt to the contour of the ground. A first spring, installed between the hitching structure and the mowing group, also lightens the mowing group while tending to cause it to pivot around the pivot pin.

The mowing group, moreover, rests on two wheels, each installed behind a longitudinal end of the mowing group. The rolling axis of each wheel is more precisely connected to the mowing group by a vertically deformable parallelogram on which a spring acts. The latter tends to deform the parallelogram so as to lighten the corresponding longitudinal end of the mowing group.

This known mower exhibits several drawbacks.

Considering that the mowing group of this known mower is connected to the hitching structure by a pivot pin, the hitching structure is connected rigidly to the hitch of the tractor and the mowing group can adapt to the contour of the ground only by pivoting around the geometric axis of said pivot pin. Since the displacement in height of the mowing group is considerably limited because of this, the adaptation of the mowing group to the contour of the ground is therefore very imperfect.

Considering such an arrangement, the first longitudinal end of the mowing group is, in addition, poorly lightened.

An additional drawback of this known mower further appears at the level of the wheels which are directed in the direction of work and located far back from the rear wheels of the tractor. As a result, the wheels skid on the ground when the driver of the tractor is led to take tight turns.

SUMMARY OF THE INVENTION

The invention has as its object to eliminate the foregoing drawbacks.

For this purpose, it is provided according to the invention, that during work, the first connection device allows, an additional displacement in height of the cutting mechanism in relation to the hitching structure and that the wheel is able to pivot around a geometric axis directed upward. Consequently, the two longitudinal ends of the cutting mechanism can be displaced in height and quickly adapt to the contour of the ground independently of one another. As a result of this arrangement, the load-lightening of the cutting mechanism is also better assured. In addition, since the wheel of this cutting machine according to the invention is able to pivot around a geometric axis directed upward, the wheel can be oriented in the direction of displacement of the cutting mechanism, which makes the cutting machine easily maneuverable during work.

According to a further aspect and object of the invention, it is also provided that the first connection device comprises an oscillating arm connected, on the one hand, directly or indirectly to the hitching structure by a first pivot connection and, on the other hand, to the cutting mechanism by a second pivot connection. During work, the geometric axes of these pivot connections are directed forward. A good adaptation of the cutting mechanism to the contour of the ground is obtained when the geometric axes are at least approximately parallel to one another and when they form, in top view with the longitudinal axis of the cutting mechanism, an angle between 45° and 90°, with preferably about 60°. It is also advantageous that the geometric axis of the second pivot connection extends at least approximately at half the height of the cutting mechanism.

According to another aspect of the invention, it is also provided that the second connection device, by which the wheel is connected to the cutting mechanism, comprises an element for guiding the wheel and a structure that is deformable in height. The guiding element is connected to the deformable structure by a first hinge whose said geometric axis is directed upward and around which the wheel is able to pivot.

A good adaptation of the cutting mechanism to the contour of the ground is obtained when the deformable structure comprises a bracket, to which the guiding element is connected by means of the first hinge, and which is connected to the cutting mechanism by means of two connecting rods extending at least approximately at right angles to the longitudinal axis of the cutting mechanism. In this case, it is also advantageous that the deformable structure forms, with a part of the cutting mechanism, at least approximately a deformable parallelogram. To install the wheel in the close vicinity of the bracket, the bracket advantageously extends backward and upward, and the first hinge is installed at the upper part of the bracket.

According to a further very advantageous aspect of the invention, it is additionally provided that the first load-lightening element is connected to the first connection device. The first load-lightening element can, for example, extend between the first connection device and the cutting mechanism.

According to another very advantageous aspect of the invention, it is also provided that the second load-lightening element is connected to the second connection device.

In the embodiments where the second connection device comprises a bracket and two connecting rods, the second load-lightening element can extend between the bracket and the upper connecting rod of this deformable structure. In this way, the two load-lightening elements act on the connection devices to lighten the cutting mechanism.

In addition, it is particularly advantageous that at least one of the two load-lightening elements comprises a gas spring. Actually, gas springs generally exhibit a reduced bulk and their load-lightening force can be easily measured and regulated.

According to a still further aspect and objective of the harvesting machine according to the invention, there is further provided at least one element for lifting of the cutting mechanism, to lift said cutting mechanism at least approximately parallel above the ground. An advantageous solution consists in equipping each connection device with a respective lifting element, indeed to combine each load-lightening element with a corresponding lifting element.

According to yet another aspect of the invention, it is, in addition, provided that the pivoting of the wheel around the geometric axis of a first hinge can be blocked by a first locking device. Further, the first connection device includes a second hinge exhibiting a geometric axis directed upward.

The cutting mechanism can be brought from a work position in which its longitudinal axis extends crosswise to the direction of work, into a transport position in which its longitudinal axis extends at least approximately parallel to the direction of transport, by pivoting around the geometric axis of the second hinge.

The pivoting of the cutting mechanism around the geometric axis of the second hinge can be blocked by a second locking device, so that during work, the second locking device blocks the pivoting of the cutting mechanism around the geometric axis of the second hinge, while the wheel is able to pivot around the geometric axis of the first hinge. However, during transport, the first locking device blocks the pivoting of the wheel around the geometric axis of the first hinge, while the cutting mechanism is able to pivot around the geometric axis of the second hinge.

In the embodiment where the first connection device comprises an oscillating arm, the second hinge can be provided between the hitching structure and the first pivot connection of the oscillating arm. Consequently, the entire body, composed of the two connection devices of the cutting mechanism and of the wheel, is able to pivot around the geometric axis of the second hinge.

Advantageously, the geometric axis of said second hinge can be at least approximately parallel to the geometric axis of the first hinge.

The pivoting of the cutting mechanism from its transport position to its work position, around the geometric axis of the second hinge, is performed under the action of an operating element. The second locking device, in part at least, includes this operating element.

The first locking device includes an orientation element that is used, for the transport, to orient the wheel in the direction of transport under the action of a positioning element. The positioning element is intended to act by the orientation element on a lever connected rigidly to the guiding element of the wheel and exhibits two stops installed on both sides of the geometric axis of the first hinge.

Preferably, the contact between the lever and the orientation element is performed by means of at least one roller rotating around an axis, which is at least approximately parallel to the geometric axis of the first hinge, around which the wheel is able to pivot.

During work, the wheel extends behind at least a part of the work elements while during transport the wheel extends in the extension of the cutting mechanism.

In addition, it is further provided that the hitching structure comprises three hitching points intended to be connected to the three hitching points of the hitching device of a power-driven vehicle.

According to an additional aspect of the invention, it is, on the other hand, provided that the operating element consists of at least one cylinder. This operating cylinder can be in drive connection with the first connection device. For this purpose, the operating element can advantageously comprise two cylinders which extend as extensions of one another and which are fastened to the hitching structure, and two pistons, each mounted to slide in the corresponding cylinder; while the drive connection can be performed by a rack installed between said pistons; the rack meshing with a toothed sector which is connected to the first connection device and which is centered on the geometric axis of the second hinge.

In certain embodiments, it is advantageous to use a hydraulic operating cylinder. Also, the positioning element can comprise at least one hydraulic cylinder.

The invention finds a particularly advantageous application in the field of mowers or harvesting machines with or without elements for processing the cut product.

BRIEF DESCRIPTION OF THE DRAWINGS

Other objects, advantages and characteristics of the invention will become apparent from the following description of a nonlimiting example of the preferred embodiment of the invention, particularly with reference to the accompanying drawings in which.

DETAILED DESCRIPTION OF THE PREFERRED EMBODIMENT

Figure 1:
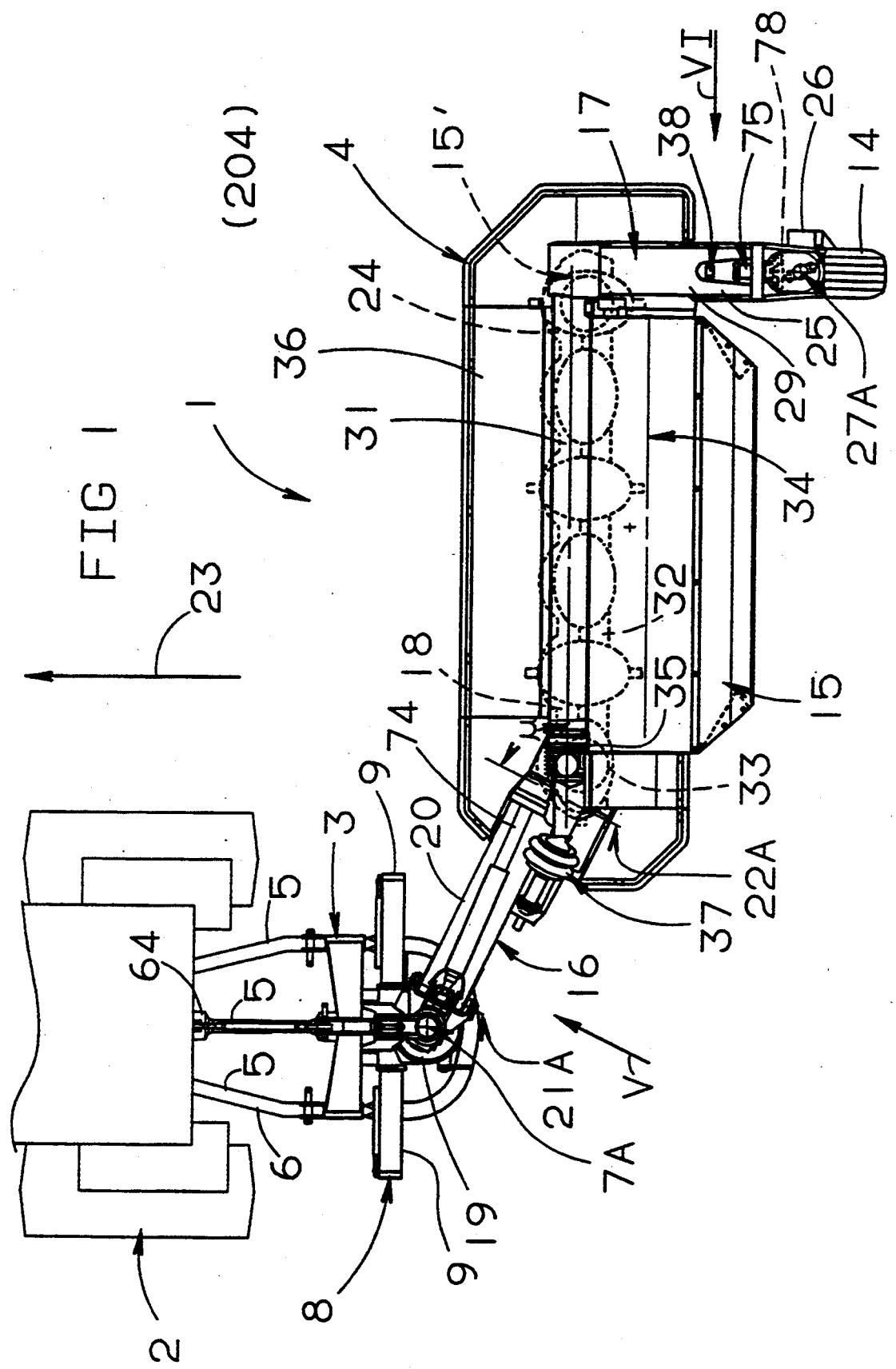
FIG. 1 represents a top view of a cutting machine according to the invention connected to a farm tractor and placed in the work position.

Referring now to the drawings, wherein like reference numerals designate identical or corresponding parts throughout the several views, FIGS. 1 to 8 represent a mower or harvester 1 according to the invention. It is hitched to a farm tractor 2.

Figure 2:
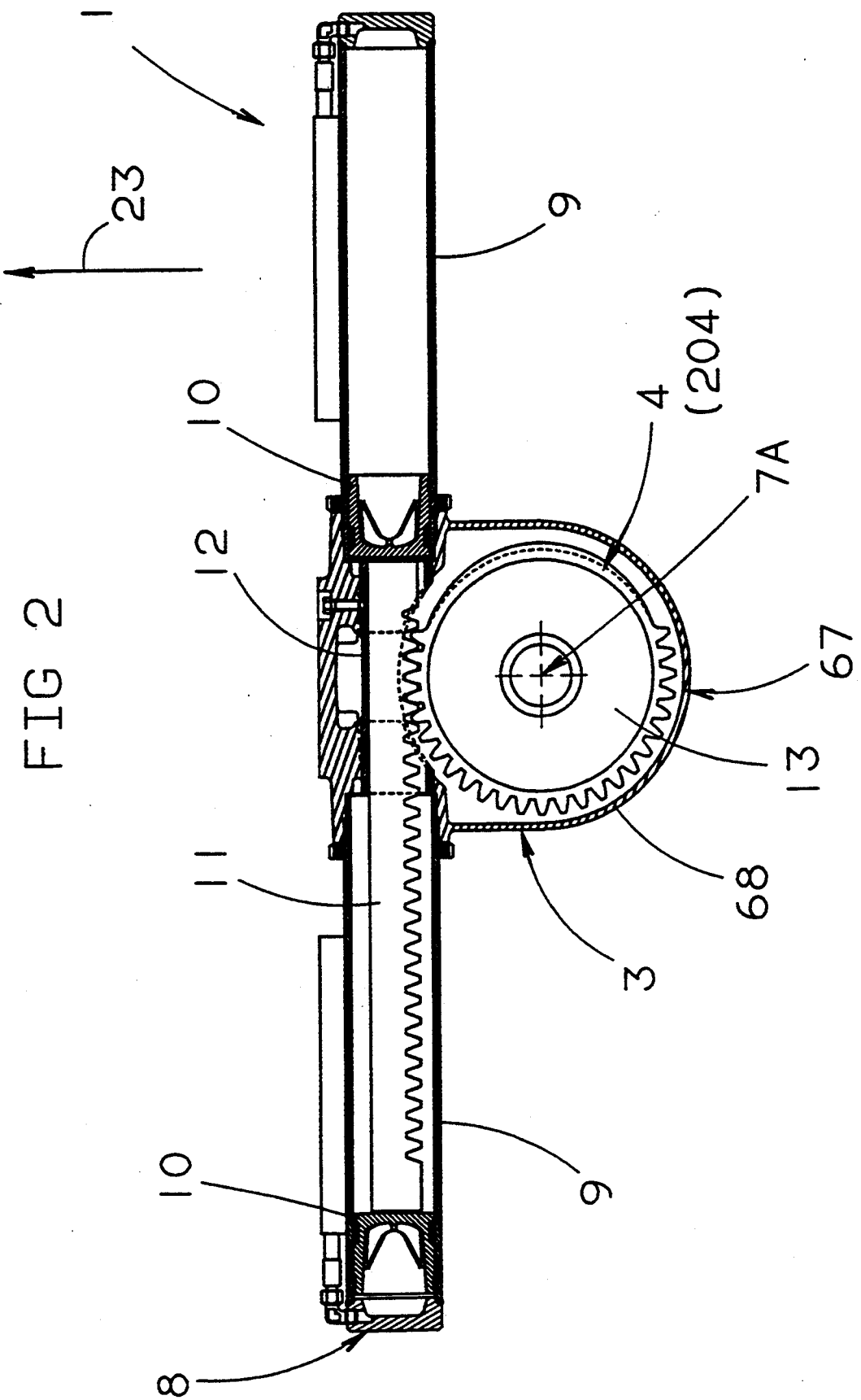
FIG. 2 represents, in the work position of FIG. 1, a section of the operating element showing the rack which meshes with the toothed sector.
Figure 3:
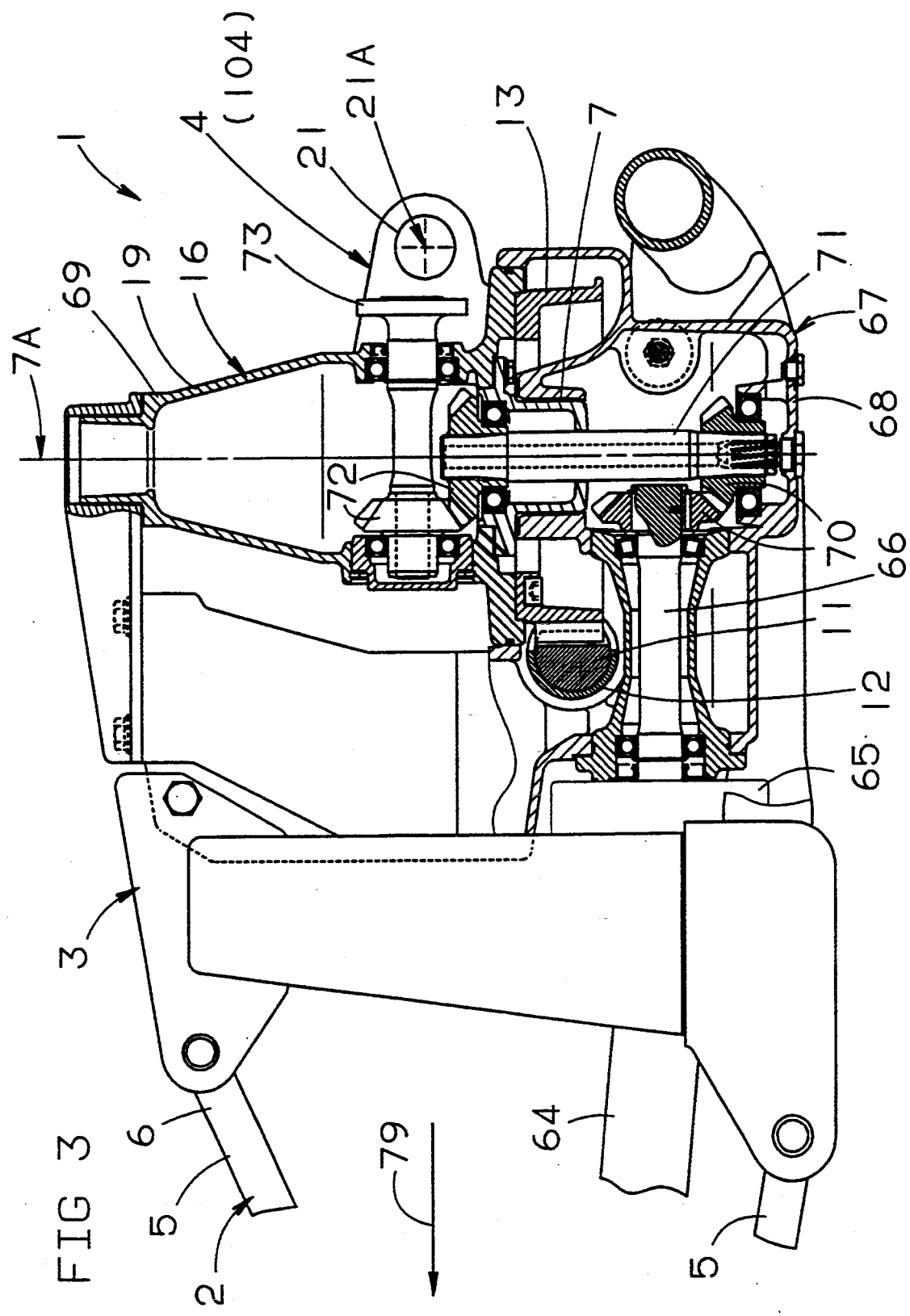
FIG. 3 represents, in the transport position, a partial section of the hitching structure and of a portion of the first connection device.

Mower 1 is composed mainly of a hitching structure 3 and a body 4. Hitching structure 3 is intended to be connected, at its front part, to the three points 5 of lifting device 6 of tractor 2. Body 4 is connected to hitching structure 3 by a cylindrical hinge 7 (FIG. 3) with geometric axis 7A at least approximately vertical. The angular position of body 4 in relation to hitching structure 3 can be modified by causing body 4 to pivot around the geometric axis 7A. The attainment of the desired angular position is performed under the action of an operating cylinder 8 which includes two cylinders 9 fastened to hitching structure 3. The two cylinders 9 are at least approximately identical and extend horizontally in the extension of one another. On the inside of each cylinder 9 of operating cylinder 8 a piston 10 (FIG. 2) is provided that is mounted to slide in the cylinder 9. Between the two pistons 10 a rack 11 is installed which is guided by a guiding part 12 placed on the back of the rack 11. In this way, rack 11 can only be translated in cylinders 9 under the action of the oil that feeds one of the longitudinal ends of operating cylinder 8, to mesh with a toothed sector 13 which is centered on geometric axis 7A and integral with body 4 of mower 1 (FIG. 3). By virtue of this arrangement, body 4 can be pivoted around the geometric axis 7A under the action of operating cylinder 8, to be brought from its transport position 104, where it extends at least approximately in the path of tractor 2 (FIGS. 3 and 4), into a work position 204, where it extends at least approximately next to the path of tractor 2 (FIGS. 1 and 2). When body 4 is in its work position 204, the oil is prevented from flowing out of operating cylinder 8, which has the effect of blocking the pivoting of said body 4 around geometric axis 7A. Conversely, during transport, the two outside chambers of operating cylinder 8 are put in communication to allow a free pivoting of body 4 around geometric axis 7A. Consequently, the handling operations during the transport of mower 1 are considerably simplified.

Body 4 of mower 1 rests on the ground by a single wheel 14 installed at the longitudinal end of body 4 far from hitching structure 3. Body 4 comprises primarily a harvesting mechanism 15 and two connection devices 16, 17.

Figure 5:
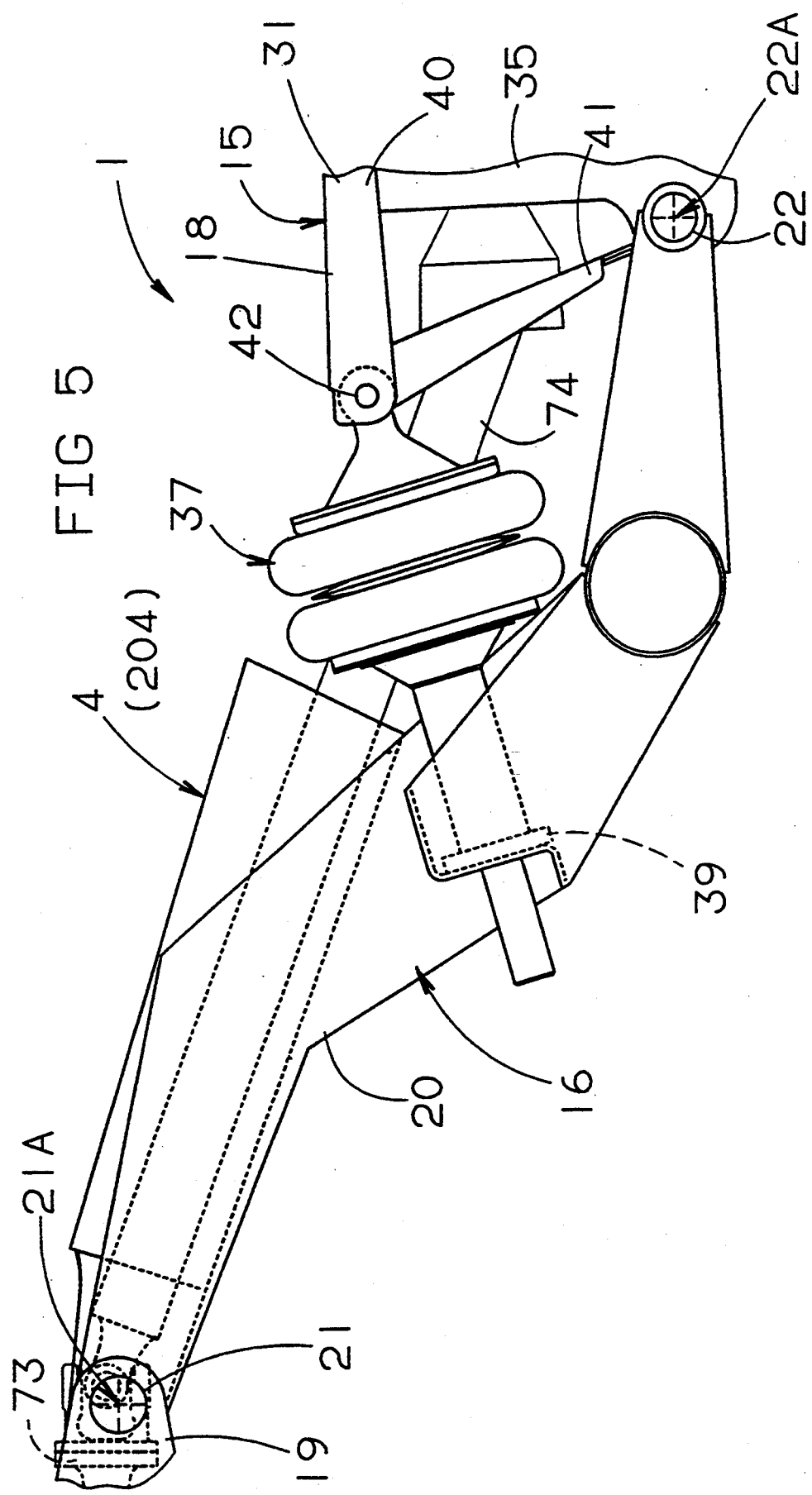
FIG. 5 represents a back side view of the cutting machine without protective elements along arrow V defined in FIG. 1.

The first connection device 16, which is shown in detail in FIGS. 3 and 5, connects the first longitudinal end 18 of harvesting mechanism 15 to hitching structure 3. For this purpose, the first connection device 16 is composed of a hitching head 19 mounted to pivot around geometric axis 7A of hitching structure 3 and of an oscillating arm 20 connecting the harvesting mechanism 15 to the hitching head 19. By virtue of this oscillating arm 20, the first longitudinal end 18 can be considerably displaced in height in relation to hitching structure 3 to adapt to the contour of the ground. This oscillating arm 20 is more specifically connected at one of its ends to hitching head 19 by a first pivot connection 21. Geometric axis 21A of the first pivot connection 21 extends at least approximately at right angles with the longitudinal axis of oscillating arm 20 and with geometric axis 7A. At its other end, oscillating arm 20 is connected to harvesting mechanism 15 by a second pivot connection 22 with a geometric axis 22A at least approximately parallel to the geometric axis 21A of first pivot connection 21. Moreover, geometric axis 22A of second pivot connection 22 extends, seen in the direction of work 23 at least approximately at half the height of harvesting mechanism 15 and forms, in top view, an angle μ of about 60° with the longitudinal axis 15' of the harvesting mechanism 15.

The second connection device 17 (FIG. 6) connects the second longitudinal end 24 of harvesting mechanism 15 to wheel 14. This second connection device 17 is composed of a deformable quadrilateral 25 and an element 26 for guiding wheel 14. Deformable quadrilateral 25 extends, in top view, at least approximately at right angles with longitudinal axis 15' of harvesting mechanism 15 and element 26 for guiding wheel 14 is connected to deformable quadrilateral 25 by a cylindrical hinge 27 with a geometric axis 27A that is at least approximately vertical. By virtue of this arrangement, the second longitudinal end 24 of harvesting mechanism 15 can easily be displaced in height in relation to wheel 14, to adapt to the contour of the ground, while allowing the pivoting of element 26 for guiding wheel 14. Deformable quadrilateral 25 comprises a bracket 28, at the upper part of which element 26 (for guiding wheel 14) is hinged, and which is connected to harvesting mechanism 15 by two connecting rods 29, 30. This deformable quadrilateral 25 has at least approximately the shape of a parallelogram whose side indicated by bracket 28 extends upward and backward in relation to the direction of work 23, so as to make a space for wheel 14. Advantageously, geometric axis 27A and rolling axis 14A of wheel 14 are approximately concurrent.

Figure 4:
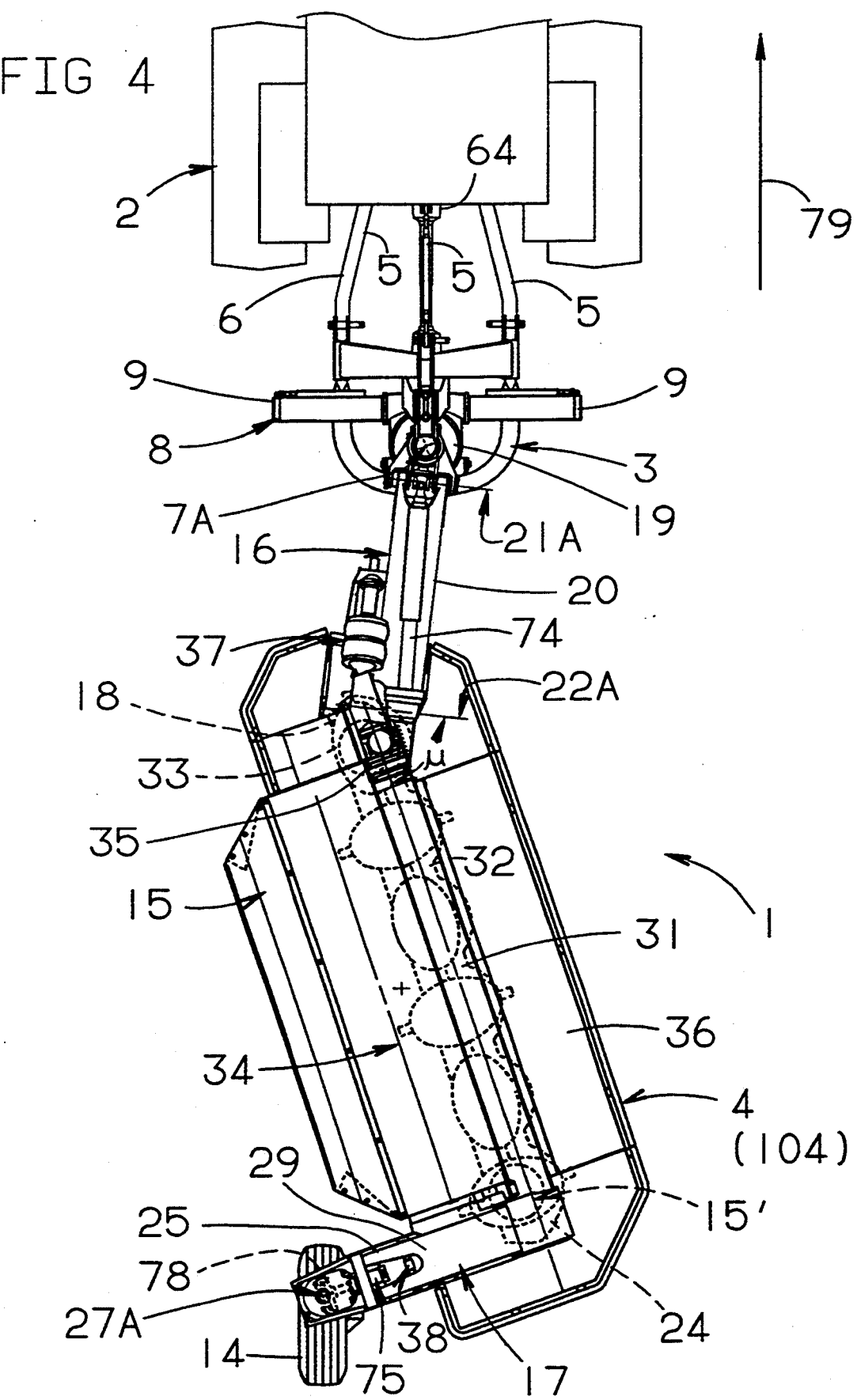
FIG. 4 represents a top view of the cutting machine placed in the transport position.

Harvesting mechanism 15 extends between the two connection devices 16, 17. Harvesting mechanism 15 comprises a carrying structure 31 to which the two connection devices 16, 17 are connected. This carrying structure 31 supports a cutting bar 32 equipped with cutting elements 33, and a processing rotor 34 of which only the axis of rotation is represented in FIGS. 1 and 4, which is intended to process the product cut by said cutting elements 33. Carrying structure 31 extends at least approximately perpendicular to the direction of work 23 and comprises an input housing 35 that is used for driving cutting elements 33 and processing rotor 34. Input housing 35 is installed in the vicinity of the second pivot connection 22 connecting first connection device 16 to harvesting mechanism 15. Furthermore, harvesting mechanism 15 also includes protective elements 36 which extend around cutting bar 32 and processing rotor 34.

The lightening of harvesting mechanism 15 is performed by two lightening and lifting elements 37, 38, each associated with a corresponding connection device 16, 17. The first lightening and lifting element 37 is installed between oscillating arm 20 of the first connection device 16 and the carrying structure 31 of harvesting mechanism 15. As can be seen in FIG. 5, the first lightening and lifting element 37 is connected, on the one hand, at least approximately to the middle of oscillating arm 20 with an elastic joint 39 and, on the other hand, to input housing 35 of carrying structure 31 by two arms 40, 41. These two arms 40, 41 form, with input housing 35, a very rigid triangulation to which the first lightening and lifting device 37 is connected with an elastic ring 42 of the "silentbloc" type. By virtue of this elastic joint 39 and elastic ring 42, the lightening and lifting element 37 is easily assembled and operates silently. In addition, the vibrations are damped.

The second lightening and lifting element 38 (FIG. 6) extends between the lower part of bracket 28 of deformable quadrilateral 25 and upper connecting rod 29 of said deformable quadrilateral 25. Here too, lightening and lifting element 38 is connected to deformable quadrilateral 25 by an elastic joint 43 and an elastic ring 44. Considering their arrangement, the two lightening and lifting elements 37, 38 assure, during the work, the lightening of longitudinal ends 18, 24 of harvesting mechanism 15.

Figure 7:
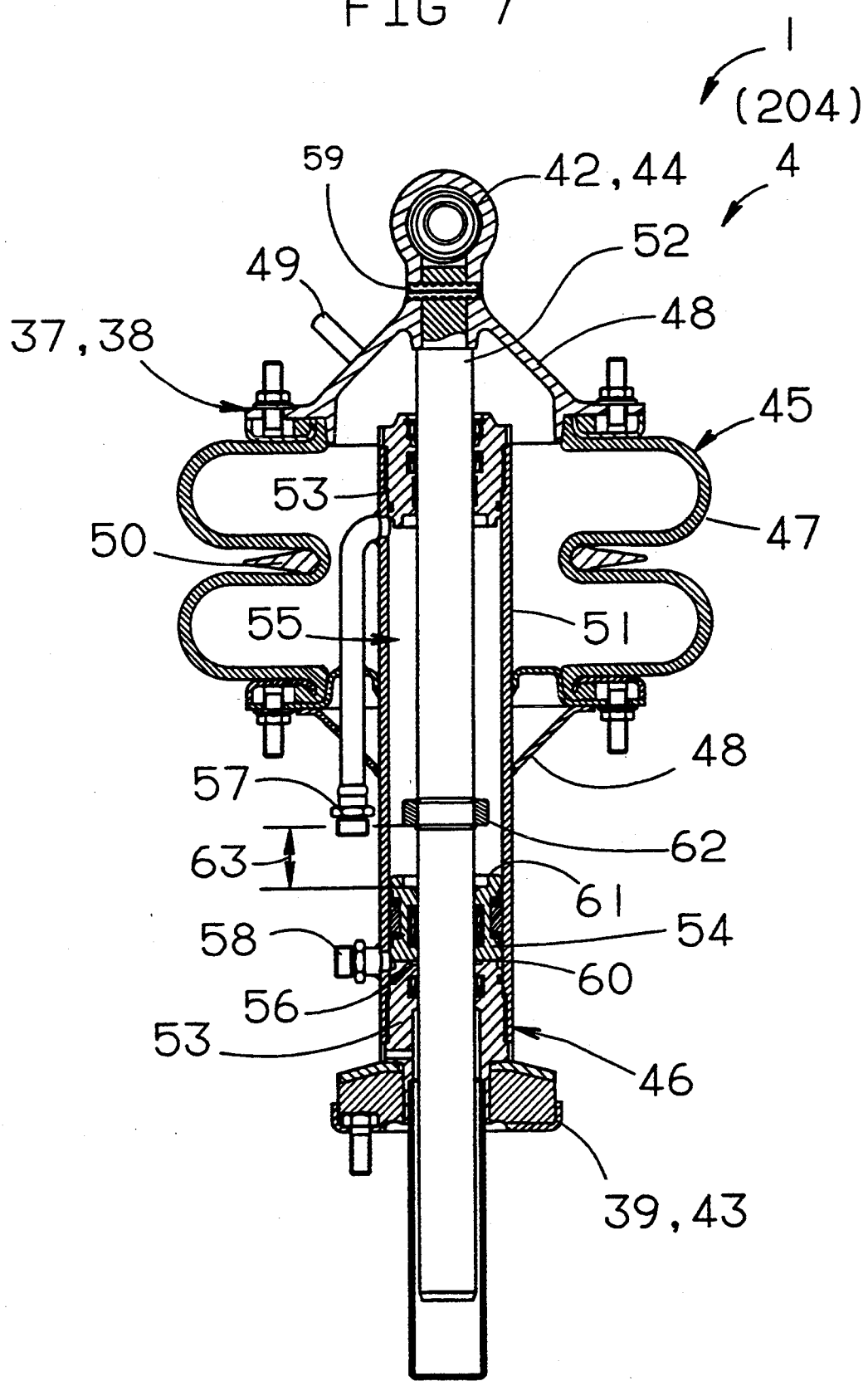
FIG. 7 represents, in section, a lightening and lifting element into its work position.
Figure 8:
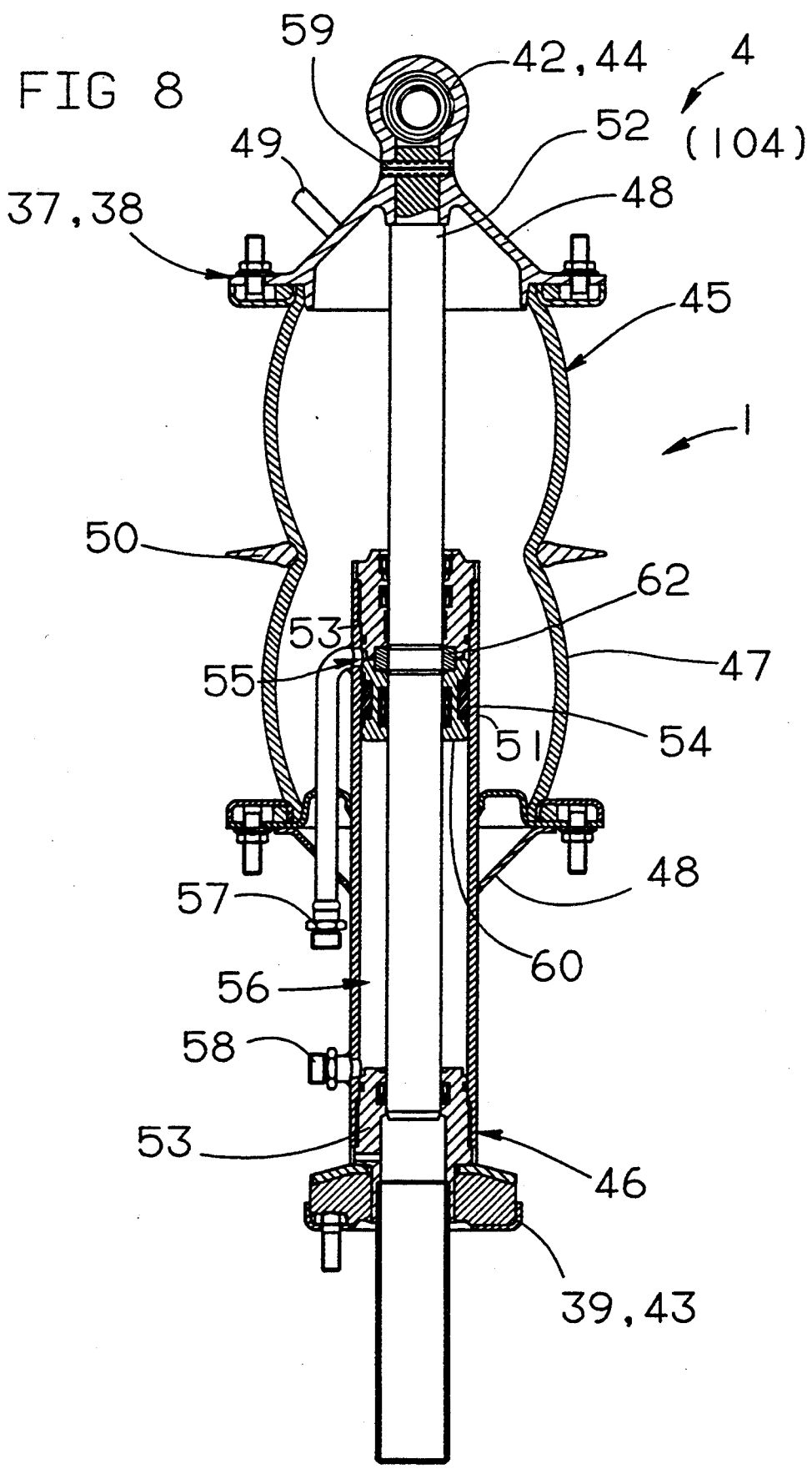
FIG. 8 represents, in section, the lightening and lifting element of FIG. 7 into its transport position.

In FIGS. 7 and 8, such a lightening and lifting element 37, 38 is shown in detail. It comprises a gas spring 45 which is used to lighten the harvesting mechanism 15, with the gas spring mounted parallel or extending in the same direction with a lifting cylinder 46 that makes it possible to lift said harvesting mechanism 15 when the user desires it. Gas spring 45 comprises a deformable jacket 47 under pressure and two flanges 48 each connected to a corresponding longitudinal end of said deformable jacket 47. Gas spring 45 contains a gas which can be brought to the desired pressure through a valve 49 installed on one of flanges 48. By inflating, more or less, deformable jacket 47 through valve 49, it is possible for the user to adapt the stiffness of gas spring 45 to the work conditions encountered.

Advantageously, gas spring 45 contains air, which makes it possible for the user easily to inflate deformable jacket 47 by a simple air pump. Further, to limit the lateral deformation of deformable jacket 47 and to force it to a more considerable longitudinal deformation, deformable jacket 47 is surrounded by a lateral stiffening element 50.

Lifting cylinder 46 comprises, in particular, a cylinder 51 and a rod 52. Rod 52 is fastened to an upper flange 48 of gas spring 45 by a pin 59, while cylinder 51 is connected rigidly to the lower flange 48 of the gas spring 45. At each of its ends, cylinder 51 is equipped with a fluidtight guide ring 53 making it possible for rod 52 to come out on both sides of cylinder 51. During work, when gas spring 45 is lengthened and shortened under the action of the displacement in height of harvesting mechanism 15, the two flanges 48 of gas spring 45 draw near and move away from one another while rod 52 slides in the cylinder 51. Since no element interferes with the displacement of the rod 52 in the cylinder 51, the harvesting mechanism 15 can easily be lightened during work.

To lift harvesting mechanism 15 thanks to lifting cylinder 46, a piston 54 is provided that is used to lengthen the lifting cylinder 46. Piston 54 is mounted to slide on rod 52 and separates cylinder 51 into two distinct chambers 55, 56, each fed through a respective pipe 57, 58. During work, the lower chamber 56 of cylinder 51 is empty and a lower face 60 of piston 54 rests, under the action of the fluid contained in upper chamber 55, against lower guide ring 53. Furthermore, upper face 61 of piston 54 is intended to rest against a collar 62 installed slightly higher on rod 52 of lifting cylinder 46. As previously stated, piston 54 does not interfere with the operation of gas spring 45 during the work, since an operational play 63 exists between upper face 61 of piston 54 and collar 62 of rod 52. However, when the user desires to lift harvesting mechanism 15, he feeds lower chamber 56 of cylinder 51 from tractor 2, which has the effect of translating piston 54 upward. The moment piston 54 begins to push collar 62 of rod 52 upward, the lifting cylinder 46 and gas spring 45 are lengthened. By so doing, piston 54 and rod 52 are translated until piston 54 arrives at the end of its travel. In its lifted position, harvesting mechanism 15 extends at least approximately parallel above the ground and the action of gas springs 45 is cancelled (FIG. 8).

The driving of harvesting mechanism 15 is performed from the power take-off not shown of tractor 2, which drives, by a telescopic shaft with universal joints 64, a torque limiter 65 mounted on the input shaft 66 of a movement transmission device 67 (FIG. 3). Transmission device 67 comprises a lower housing 68 integral with hitching structure 3 and an upper housing 69 integral with hitching head 19. Input shaft 66 of lower housing 68 of movement transmission device 67 drives, by a first pair of beveled gears 70, an intermediate shaft 71 whose axis of rotation is merged with geometric axis 7A, and which drives, by a second pair of bevel gears 72, output shaft 73 of upper housing 69. The latter drives, by another telescopic shaft with universal joints 74 (FIGS. 1, 4 and 5), the input shaft (not shown) of input housing 35 of harvesting mechanism 15. To reduce the angle of operation of the universal joints of this telescopic shaft 74, output shaft 73 of upper housing 69 extends, during normal work, at least approximately at the same level as the input shaft (not shown) of input housing 35 of harvesting mechanism 15.

Figure 6:
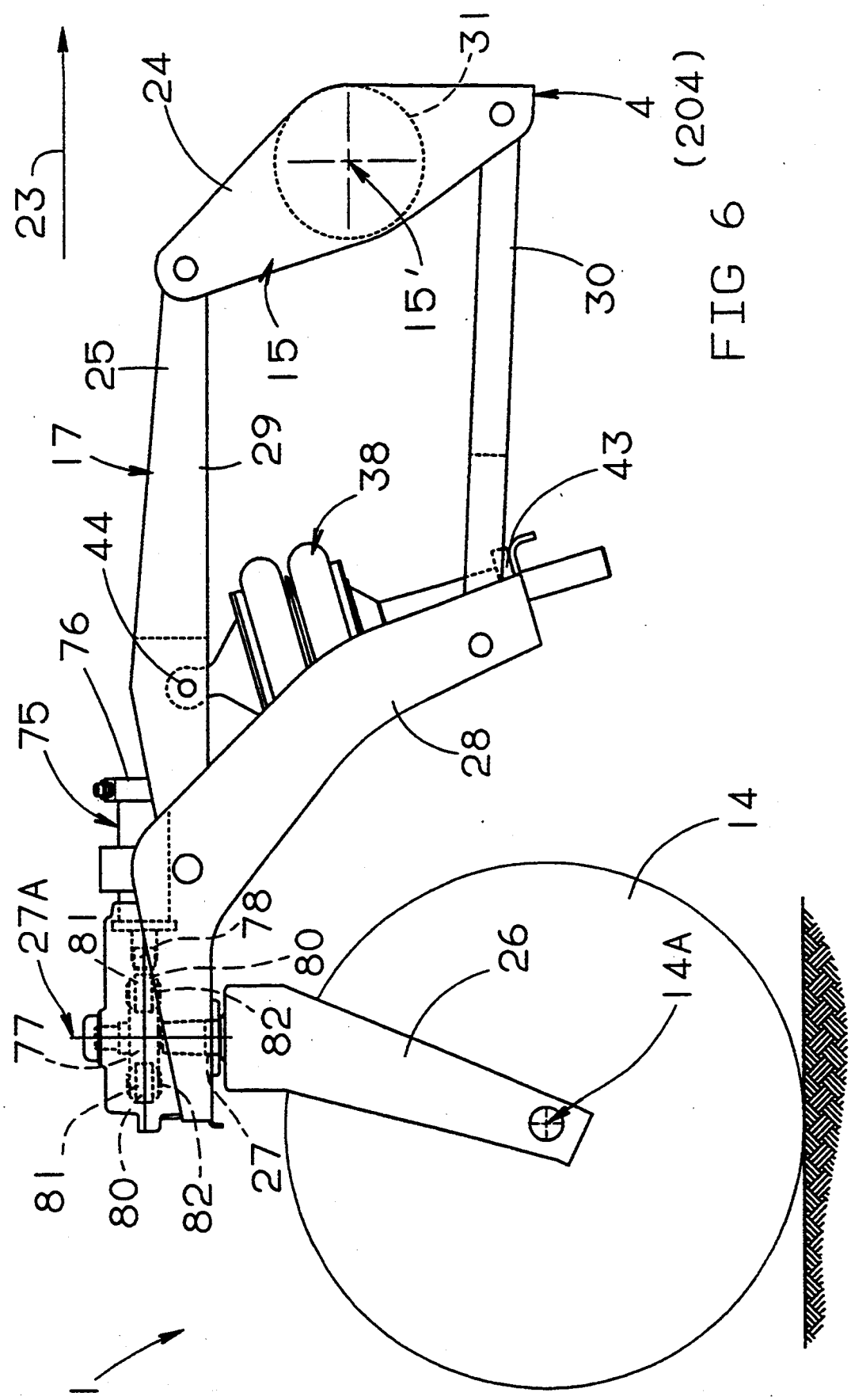
FIG. 6 represents a side view of the cutting machine without protective elements along arrow VI defined in FIG. 1.

For transport, the pivoting of element 26 for guiding wheel 14 can be blocked by a locking device 75 (FIGS. 1, 4 and 6). Locking device 75 comprises in particular a positioning cylinder 76 fastened to bracket 28 of deformable quadrilateral 25 and a lever 77 connected rigidly to element 26 for guiding wheel 14. During work, positioning cylinder 76 does not act on the lever 77, which makes it possible for wheel 14 to be oriented automatically around geometric axis 27A as a function of its displacement. On the other hand, for transport, positioning cylinder 76 acts on lever 77 by an orientation element 78, so as to orient wheel 14 in the direction of transport 79 and to hold the wheel 14 in its transport position (FIG. 4). For this purpose, lever 77 exhibits two stops 80 extending on both sides of geometric axis 27A and which are each made in the shape of a roller 81. Considering the fact that each roller 81 is, in addition, mounted to pivot around a pin 82 directed at least approximately vertically, the orientation and the locking of wheel 14 is performed easily.

Mower 1 according to the invention operates as follows:

During transport (FIGS. 3, 4 and 8), operating cylinder 8 allows the pivoting of body 4 around geometric axis 7A, while wheel 14 is oriented in direction of transport 79. The two lifting cylinders 46 hold harvesting mechanism 15 at least approximately parallel above the ground. Since body 4 of mower 1 extends at least approximately in the path of tractor 2, the handling operations during transport are facilitated. In addition, only a small space is necessary for storage.

To bring body 4 of mower 1 from its transport position 104 into its work position 204, the pivoting of wheel 14 around geometric axis 27A is allowed by positioning cylinder 76 and body 4 is pivoted into its work position 204 under the action of operating cylinder 8.

Considering that body 4 rests on the ground, both in its transport position 104 and in its work position 204 by at least one wheel 14, the tractor maintains good stability. Furthermore, as a result of the improved movement transmission device 67, harvesting mechanism 15 is able to be driven in all the positions in which it can be pivoted around geometric axis 7A.

During work (FIGS. 1, 2, 5, 6 and 7), operating cylinder 8 blocks the pivoting of body 4 around geometric axis 7A while wheel 14 is able to pivot around geometric axis 27A. The action of the lifting cylinders 46 is eliminated so as to make it possible for harvesting mechanism 15 to adapt to the contour of the ground. In addition, since each longitudinal end 18, 24 is lightened, harvesting mechanism 15 easily passes above the obstacles that the contour of the ground can present.

Obviously various modifications are possible, particularly in regard to the make-up of the various elements or by substitution of technical equivalents within the scope of the above teachings. It is therefore to be understood that within the scope of the appended claims, the invention may be practiced otherwise than as specifically described herein.

What is claimed as new and desired to be secured by Letters Patent of the United States is:

1. Cutting machine comprising:
   a hitching structure to be connected to a hitch of a power-drive vehicle;
   a cutting mechanism which extends, during work, crosswise to a direction of work;
   a first connection device connecting the cutting mechanism to the hitching structure, said first connection device being connected to the cutting mechanism at least approximately in the vicinity of a first longitudinal end of said cutting mechanism and allowing, during work, the pivoting of said cutting mechanism in relation to the hitching structure around geometric axis directed forward;
   a first load-lightening element associated with said first connection device and adapted to lighten said first longitudinal end of the cutting mechanism;
   a wheel placed in the vicinity of a second longitudinal end of the cutting mechanism and which rolls over the ground during work;
   a second connection device connecting said wheel to the cutting mechanism, said second connection device being connected to the cutting mechanism at least approximately in the vicinity of the second longitudinal end of said cutting mechanism and allowing a displacement in height of the cutting mechanism in relation to said wheel; and
   a second load-lightening element associated with said second connection device and adapted to lighten the second longitudinal end of the cutting mechanism;
   wherein, during work, the first connection device allows a displacement in height of the cutting mechanism in relation to the hitching structure and the wheel is able to pivot around a geometric axis directed upward.

2. The cutting machine according to claim 1, wherein the first connection device comprises an oscillating arm connected, on the one hand, directly or indirectly to the hitching structure by a first pivot connection and, on the other hand, to the cutting mechanism by a second pivot connection; and during work, geometric axes of each pivot connection being directed forward.

3. The cutting machine according to claim 2, wherein said geometric axes are at least approximately parallel to one another and form, in top view, an angle with the longitudinal axis of the cutting mechanism, between 45° and 90°, with preferably about 60°.

4. The cutting machine according to claim 2, wherein the geometric axis of the second pivot connection extends at least approximately at half the height of the cutting mechanism.

5. The cutting machine according to claim 1, wherein the second connection device comprises a guiding element for guiding the wheel and a structure that is deformable in height, said guiding element is connected to said deformable structure by a first hinge whose said geometric axis is directed upward.

6. The cutting machine according to claim 5, wherein the deformable structure comprises a bracket, to which the guiding element is connected by means of the first hinge, and which is connected to the cutting mechanism by means of two connecting rods extending at least approximately at right angles to a longitudinal axis of the cutting mechanism.

7. The cutting machine according to claim 6, wherein the deformable structure forms, with a part of the cutting mechanism, at least approximately a deformable parallelogram.

8. The cutting machine according to claim 6, wherein the bracket extends backward and upward and the first hinge is installed at the upper part of said bracket.

9. The cutting machine according to claim 1, wherein the first lightening element is connected to the first connection device.

10. The cutting machine according to claim 9, wherein the first lightening element extends between the first connection device and the cutting mechanism.

11. The cutting machine according to claim 1, wherein the second lightening element is connected to the second connection device.

12. The cutting machine according to claim 11, wherein:
    (a) the second connection device comprises a guiding element for guiding the wheel and a structure that is deformable in height, said guiding element is connected to said deformable structure by a first hinge whose said geometric axis is directed upward;
    (b) the deformable structure comprises a bracket, to which the guiding element is connected by means of the first hinge, and which is connected to the cutting mechanism by means of two connecting rods extending at least approximately at right angles to the longitudinal axis of the cutting mechanism; and
    (c) the second lightening element extends between the bracket and the upper connecting rod of the deformable structure.

13. The cutting machine according to claim 1, wherein at least one of the two lightening elements comprises a gas spring.

14. The cutting machine according to claim 1, further including at least one element for lifting the cutting mechanism to lift the cutting mechanism at least approximately parallel above the ground.

15. The cutting machine according to claim 14, wherein each of the first and second connection devices is equipped with a respective one of said lifting elements.

16. The cutting machine according to claim 15, wherein each lifting element is combined with a corresponding one of said lightening elements.

17. The cutting machine according to claim 1, wherein the pivoting of the wheel around the geometric axis of a first hinge can be blocked by a first locking device; and the first connection device comprises a second hinge exhibiting a geometric axis directed upward, the cutting mechanism being able to be brought from a work position, in which its longitudinal axis extends crosswise to the direction of work, into a transport position, in which its longitudinal axis extends at least approximately parallel to the direction of transport, by pivoting around the geometric axis of said second hinge, the pivoting of the cutting mechanism around the geometric axis of the second hinge being able to be blocked by a second locking device, whereby during work, the second locking device blocks the pivoting of the cutting mechanism around the geometric axis of the second hinge, while the wheel is able to pivot around the geometric axis of the first hinge;

and whereby during transport, the first locking device blocks the pivoting of the wheel around the geometric axis of the first hinge, while the cutting mechanism is able to pivot around the geometric axis of the second hinge.

18. The cutting machine according to claim 17, wherein:

(a) the first connection device comprises an oscillating arm connected on the one hand, directly or indirectly to the hitching structure by a first pivot connection and, on the other hand, to the cutting mechanism by a second pivot connection; during work, the geometric axis of each pivot connection being directed forward; and (b) the second hinge is provided between the hitching structure and the first pivot connection of the oscillating arm.

19. The cutting machine according to claim 17, wherein the geometric axis of the first hinge is at least approximately parallel to the geometric axis of said second hinge.

20. The cutting machine according to claim 17, wherein the pivoting of the cutting mechanism from its transport position to its work position, around the axis of the second hinge, is performed under the action of an operating element.

21. The cutting machine according to claim 20, wherein the second locking device, in part at least, includes said operating element.

22. The cutting machine according to claim 17, wherein the first locking device comprises an orientation element that is used, for transport, to orient the wheel in the direction of transport under the action of a positioning element.

23. The cutting machine according to claim 22, wherein the positioning element acts by the orientation element on a lever connected rigidly to the guiding element of the wheel and exhibits two stops installed on both sides of the geometric axis of the first hinge.

24. The cutting machine according to claim 23, wherein the contact between the lever and the orientation element is performed by means of at least one roller rotating around a pin which is at least approximately parallel to the geometric axis of the first hinge.

25. The cutting machine according to claim 17, wherein during work, the wheel extends behind at least a part of the work elements while during transport, the wheel extends in the extension of the cutting mechanism.

26. The cutting machine according to claim 1, wherein the hitching structure comprises three hitching points for connection to three hitching points of a hitching device of a power-driven vehicle.

27. The cutting machine according to claim 20, wherein the operating element consists of at least one cylinder.

28. The cutting machine according to claim 27, wherein the operating cylinder is in drive connection with the first connection device.

29. The cutting machine according to claim 28, wherein:

the operating cylinder comprises two cylinders which extend as the extensions of one another and which are fastened to the hitching structure, and two pistons, each mounted to slide in a corresponding one of said two cylinders; and the drive connection is performed by a rack installed between said pistons, said rack meshing with a toothed sector which is connected to the first connection device and which is centered on the geometric axis of the second hinge.

30. The cutting machine according to claim 27, wherein the operating cylinder is a hydraulic cylinder.

31. The cutting machine according to claim 22, wherein the positioning element comprises at least one hydraulic cylinder.

32. The cutting machine according to claim 1, wherein said cutting machine is a mower with or without elements for processing cut product.

* * * * *